United States Patent [19] [11] 4,085,961
Brown [45] Apr. 25, 1978

[54] TOOL BOX MOUNT FOR PICKUP TRUCK

[76] Inventor: Manuel D. Brown, 21855 Walnut Ave., Riverdale, Calif. 93627

[21] Appl. No.: 696,842

[22] Filed: Jun. 17, 1976

[51] Int. Cl.² ............................................. B65D 43/16
[52] U.S. Cl. .................................. 296/37.6; 108/139;
217/60 B; 220/334; 224/29 L; 248/282;
312/DIG. 33
[58] Field of Search ................. 296/37.6, 37.12, 37.14;
224/29 L, 42.03 A, 42.32, 42.33, 42.43;
248/282, 284, 203, 310; 108/140, 139; 217/60
B; 220/334; 312/DIG. 33, 269; 211/186

[56] References Cited
U.S. PATENT DOCUMENTS

| 1,591,279 | 7/1926 | Carhart | 224/42.32 |
| 2,019,636 | 11/1935 | Scranton | 224/42.32 |
| 3,640,423 | 2/1972 | Parker et al. | 296/37.6 |
| 3,826,529 | 7/1974 | Wood | 296/37.6 |

Primary Examiner—Richard A. Bertsch
Attorney, Agent, or Firm—Clarence A. O'Brien; Harvey B. Jacobson

[57] ABSTRACT

A tool box mount for a pickup truck has a frame which supports a tool box, and is itself supported above a bed of the pickup truck for swinging movement over the bed between a position wherein the tool box can be opened during use and a position where the tool box cannot be opened when the box is not in use. Pivotally mounted on a base plate secured to the bed of the pickup truck is an arm assembly which supports the frame for swinging movement, while a lock assembly affixed to the base plate selectively retains the frame in the position permitting the tool box to be opened.

7 Claims, 7 Drawing Figures

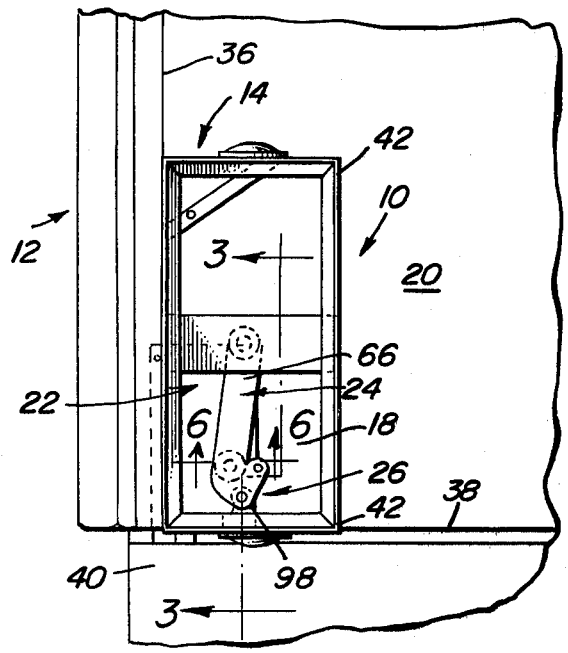
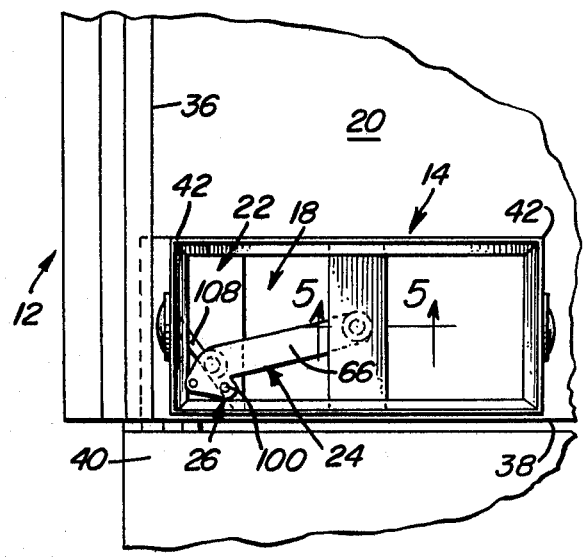
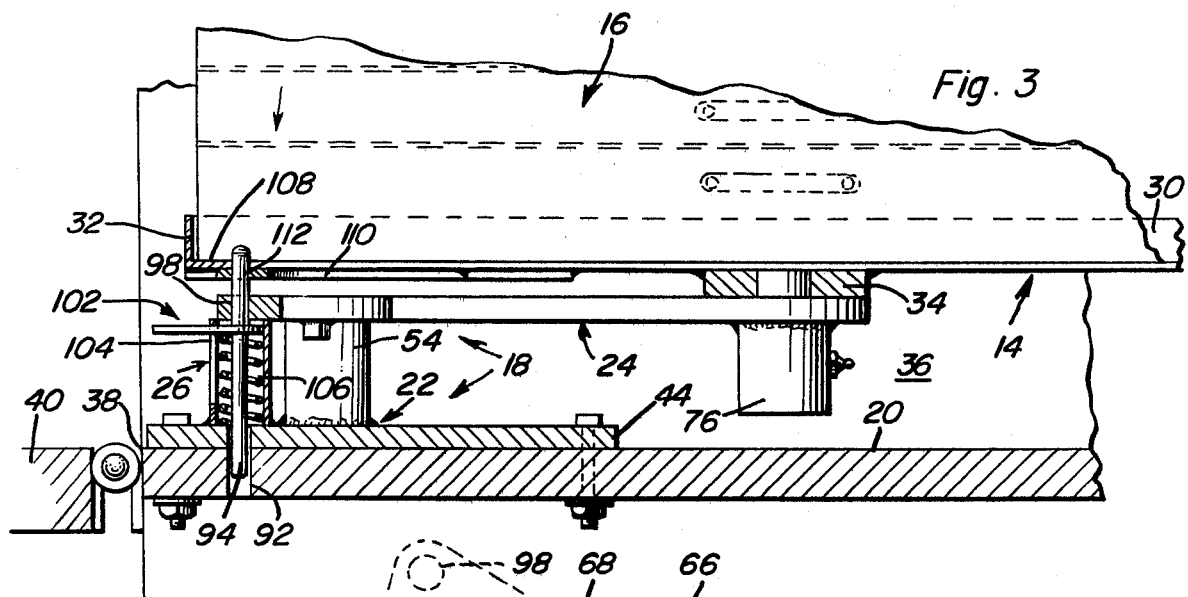

U.S. Patent April 25, 1978 Sheet 2 of 2 4,085,961
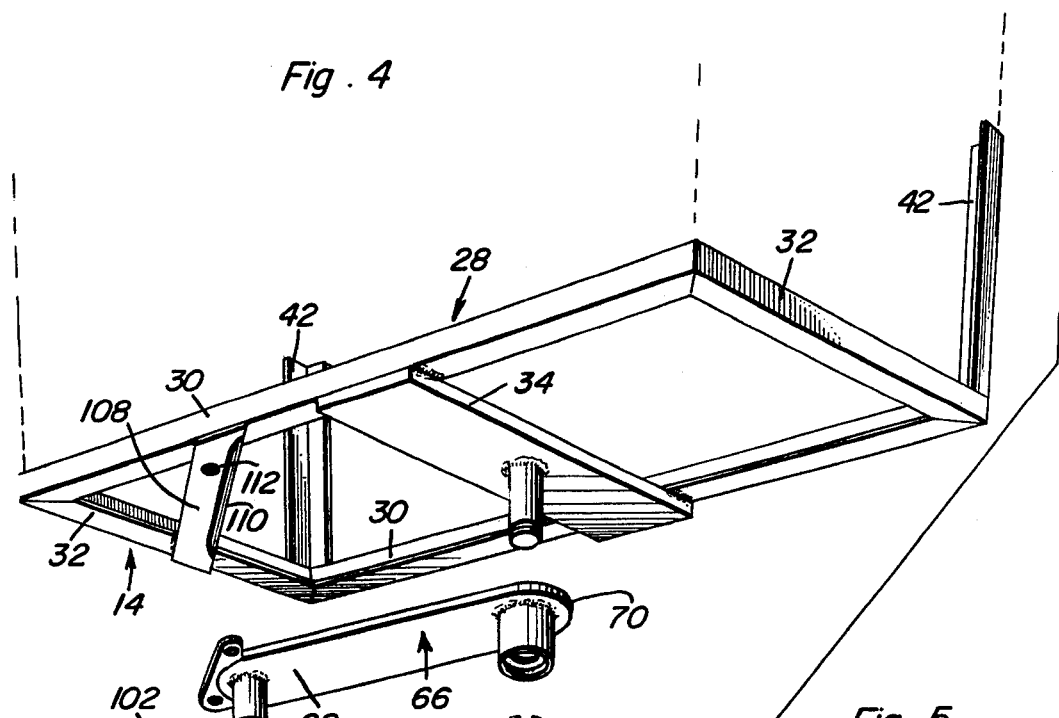
Fig. 4
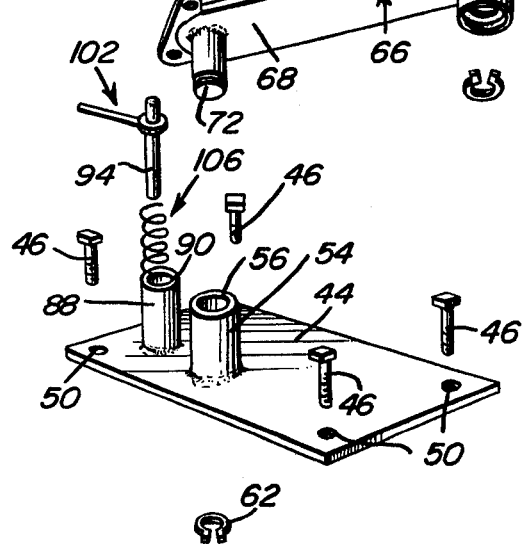
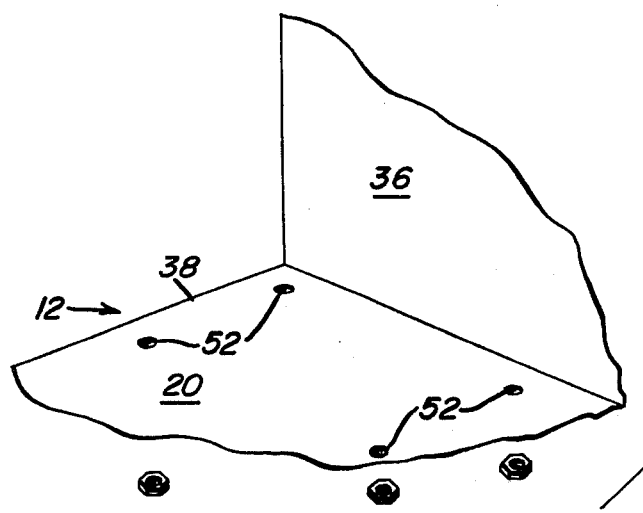
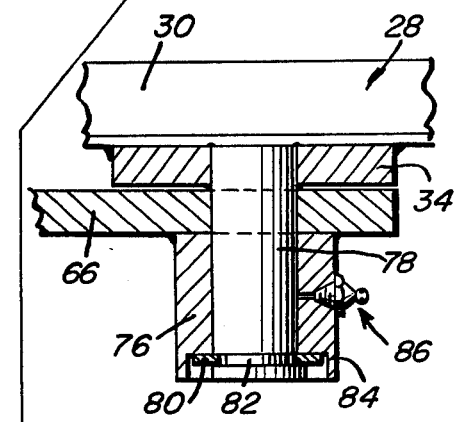
Fig. 5
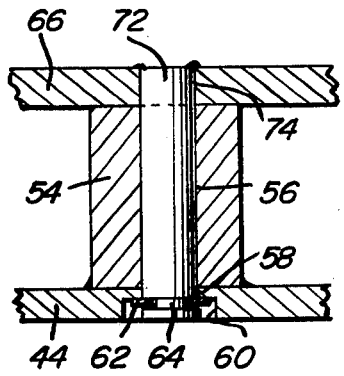
Fig. 6

TOOL BOX MOUNT FOR PICKUP TRUCK

BACKGROUND OF THE INVENTION

1. Field of the Invention

This invention relates generally to the mounting of a tool box in the cargo area of a pickup truck, and the like, and particularly to a tool box mount which permits a tool box to be moved between a position wherein the tool box may be opened during use and a position where the tool box may not be opened when the box is not being used.

2. Description of the Prior Art

It is frequently necessary for mechanics, appliance servicemen, and the like, to perform service calls to a customer's residence or place of business. Accordingly, these workmen generally use a pickup or similar truck fitted with tool-carrying compartments in the cargo area thereof. Such trucks, however, are expensive, and frequently the workman does not require the extensive storage space generally provided with such installations. Accordingly, it is often desirable for the workman to merely outfit his truck with one or two tool boxes of conventional construction.

While the weight of such tool boxes generally discourages thieves from taking the box from the cargo area of the truck, there is frequently nothing to stop one from merely opening the box and removing tools therefrom. This is particularly the case where the tool box is of such weight as to discourage the workman from moving the box around on the bed of the truck from a position where tools can be removed from the box to a position where it is not possible to open the tool drawers, and the like, of the box.

I am aware of U.S. Pat. Nos. which may be pertinent to the invention as follows: 1,502,180, 7/22/24, 1,948,131, 2/20/34, 2,713,437, 7/19/55, 3,727,971, 4/17/73, 3,826,529, 7/30/74. Generally these prior patents disclose swingable support structure, and the like, which is unsuitable for use in movably mounting a tool box or similar container within the cargo area of a pickup truck, and the like.

SUMMARY OF THE INVENTION

It is an object of the present invention to provide a mounting arrangement capable of swingingly supporting a tool box in the cargo area of a pickup or similar truck.

It is another object of the present invention to provide a tool box mount for a pickup truck, and the like, that permits the tool box to be moved between a position adjacent a side wall of the cargo area of the truck wherein the drawers of the tool box cannot be opened, and a position adjacent the tailgate of the truck where a workman has easy access to the tool box.

These and other objects are achieved according to the present invention by providing a tool box mount having: a frame arranged for supporting a tool box; and a support arrangement connected to the frame for attaching the frame to a bed of a pickup truck, and the like, and permitting the frame to swing over the bed between a first position and a second position.

The support arrangement advantageously includes a base plate anchorable to the bed of the pickup truck and rotatably receiving a shaft portion of an arm arrangement which has at an end spaced from the shaft portion a bearing for receiving a shaft provided on the frame. In this manner, the arm assembly can swing the frame about the base plate, while simultaneously the frame can be pivoting about the arm assembly. Mounted on the base plate is a locking device selectively engageable with suitable openings provided on the arm assembly for retaining the frame, and associated tool box, in either the first or second end positions.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, top plan view, with the tool box removed, showing a tool box mount according to the present invention in a first position thereof relative to the cargo area of an associated pickup or similar truck.

FIG. 2 is a fragmentary, top plan view, similar to FIG. 1, but showing the tool box mount according to the invention in a second position relative to the cargo area of the truck.

FIG. 3 is a fragmentary, enlarged, sectional view taken generally along the line 3—3 of FIG. 1, but showing the tool box in full lines from the rear.

FIG. 4 is an exploded, partly fragmentary, perspective view showing a tool box mount according to the present invention in relation to the portion of the cargo area of a truck on which the mount is secured.

FIG. 5 is a fragmentary, enlarged, sectional view taken generally along the line 5—5 of FIG. 2.

FIG. 6 is a fragmentary, enlarged, sectional view taken generally along the line 6—6 of FIG. 1.

FIG. 7 is a fragmentary, enlarged, top plan view, partly cut away, taken generally in the area of the direction arrow in FIG. 3, but with the tool box and frame removed.

DESCRIPTION OF THE PREFERRED EMBODIMENTS

Referring now more particularly to FIGS. 1 through 3 of the drawings, a tool box mount 10 according to the present invention is shown as secured in the cargo area of a pickup truck 12, and the like. This mount 10 includes a frame 14 arranged for supporting a tool box 16, and a support arrangement 18 connected to frame 14 for attaching frame 14 to the bed 20 of truck 12 and permitting frame 14 to swing over bed 20 between a first position as shown in FIG. 1 and a second position as shown in FIG. 2. More specifically, the position shown in FIG. 1 is the storage position for tool box 16 wherein the drawers are disposed immediately adjacent a side wall of truck 12 so as to prevent the drawers from being opened, while the position shown in FIG. 2 is that employed when a workman (not shown) desires to open the drawers of tool box 16 in order to remove tools therefrom.

The support arrangement 18 includes a base arrangement 22 anchorable to bed 20 as by the illustrated bolts and nuts, together with an arm arrangement 24 rotatably connected to both the base arrangement 22 and to frame 14 for swinging frame 14 between the aforementioned first position and second position. A lock device 26 can be mounted on base arrangement 22 and disposed selectively engageable with arm arrangement 24 for retaining the latter and frame 14 in one of the first and second positions.

Referring now more particularly to FIGS. 4 through 6 of the drawings, frame 14 includes a framework 28 which lies in a single plane of finite thickness, and is constructed to be rectangular in plane from a plurality of paired angle members 30 and 32 fastened together in a conventional manner. Bisecting the framework 28 is a longitudinally extending element 34 connected to the arm arrangement 24 and arranged specifically for being perpendicular to an adjacent side wall 36 (FIGS. 1 through 3) of truck 12 when frame 14 is in the first, or FIG. 1, position, and perpendicular to a rear edge 38 of bed 20, which is adjacent to a conventional tailgate 40 when the frame 14 is in its second, or FIG. 2, position.

Frame 14 is further provided with at least one, and preferably the illustrated pair, of vertically upstanding buides 42 arranged extending perpendicularly from the plane of framework 28 for protecting tool box 16 from damage and for facilitating retention of the tool box 16 within the framework 28.

The base arrangement 22 includes a plate 44 attached to bed 20 as by the conventional bolts 46 and cooperating nuts 48, with the shanks of bolts 46 being disposed in the matching holes 50 in plate 44 and 52 in bed 20.

A bush 54 is mounted on plate 44 and disposed extending perpendicularly therefrom in the manner of a step bearing so as to present a through bore 56 within bush 54, and a hole 58 provided in plate 44, for journaling a portion of the arm arrangement 24. The shaft which extends into bore 56 and hole 58 terminates in a recess 60 formed in the underside of plate 44 so as to be retained in the bush 54 as by a conventional locking ring 62 disposed in a groove 64.

Arm arrangement 24 includes an elongated member 66 which has a pair of spaced end portions 68 and 70. Shaft 72, which is inserted into bush 54, is provided at the end portion 68, while a cutout 74 is provided at end 70 for receiving a hollow sleeve 76. Anchored in a cutout similar to cutout 74, but provided in element 34, is a projecting member 78 inserted into sleeve 76 and retained therein by a conventional locking ring 80 disposed in a groove 82 provided in a portion of projecting member 78 arranged in a recess 84 formed in the manner of a counterbore in the lower end portion of sleeve 76. In this manner, arm arrangement 24 is pivotally mounted on plate 44 and frame 14 is pivotally mounted on arm arrangement 24 so as to permit frame 14 to be swung relative to plate 44 and independently pivoted relative to the elongated member 66 of arm arrangement 24.

A conventional grease fitting 86, and the like, is advantageously provided in the cylindrical side wall of sleeve 76 for permitting lubrication of projecting member 78 journaled within sleeve 76 as such may become necessary.

Referring now to FIG. 7 in conjunction with FIGS. 1 through 3, the lock device 26 includes a hollow cylinder having a central through hole 90 and mounted on plate 44 so as to surround an aperture 92 provided in the plate 44 in such a manner that hole 90 is in communication with aperture 92. A pin 94 is slidably disposed in hole 90 in aperture 92, with the elongate member 66 of arm arrangement 24 being provided adjacent end portion 68 with a flange 96, which can be generally in the plan of a bell crank lever. A pair of spaced eyes 98 and 100 are provided in flange 96, with pin 94 selectively engaging one of the eyes 98, 100 for retaining frame 14 in one of the first and second positions.

A handle 102 is disposed in a slot 104 extending axially along the vertical length of cylinder 88 and includes an eyelet disposed affixed to pin 94 for moving pin 94 vertically along the axis of cylinder 88 against the bias of a, for example, coiled compression spring 106. In this manner, manipulation of handle 102 along the longitudinal extent of slot 104 against the bias of spring 106 permits pin 94 to be retracted from a respective one of the eyes 98 and 100, while releasing of handle 102 causes spring 106 to bias pin 94 upwardly toward flange 96 and into one of eyes 98, 100 provided pin 94 is in alignment with one of the eyes 98, 100.

Frame 14 is further provided with a brace 106 extending between one each of the pair of members 30 and 32 in a corner of the framework 28 in order to provide a secondary locking arrangement for frame 14 when the latter is in the second, or FIG. 2, position. This brace 108 includes a beveled edge 110 which facilitates movement of pin 96 onto the undersurface of brace 108 and into a hole 112 provided in the brace 108. Thus, whenever the tool box 16 is disposed on frame 14 when the latter is in the position shown in FIG. 2 and is out away from side wall 36 of truck 12, the extra locking feature afforded by brace 108 assures that tool box 16 will not snap loose and swing about, even possibly falling off a truck 12.

Stops 114 and 116, with one of the stops being mounted on elongate member 66 and the other on sleeve 76, are advantageously provided in order to limit the pivotal movement between elongate member 66 and base plate 44. That is, as shown by the full lines in FIG. 7, stops 114 and 116 are spaced from one another by a substantial angle when mount 10 is in the position shown in FIG. 1. When the mount 10 is swung into the position shown in FIG. 2, it will be appreciated that the stops 114 and 116 will come into abutting relationship one to the other as shown by the broken line position of 116 in FIG. 7.

As will also be appreciated by a close examination of FIGS. 1 and 2, frame 14 moves from the position shown in FIG. 1 to the position shown in FIG. 2 by first swinging the arm arrangement 24 out away from side wall 36 of truck 12 until the elongate member 66 is substantially in the position shown in FIG. 2. Then, frame 14 can be pivoted counterclockwise about the pivot axis defined by sleeve 76 and projecting member 78 until frame 14 is 90° from the position of frame 14 in FIG. 1. When frame 14 is to be moved from the second position shown in FIG. 2 to the first position shown in FIG. 1, frame 14 is first pivoted 90° clockwise and then the elongate member 66 swung back to the position of member 66 as shown in FIG. 1. By proper placement of tool box 16, the drawers of the tool box 16 will be immediately adjacent side wall 36 when the frame 14 is in the FIG. 1 position. Closing and locking of tailgate 40 in a conventional manner achieves a great amount of security of the tool box 16 within the cargo area of truck 12, since it will be appreciated that the frame 14 cannot be swung out into the FIG. 2 position when tailgate 40 is closed, since it is necessary to swing frame 14 out over the open tailgate 40 in order to achieve the position change from FIG. 1 to FIG. 2.

As a further security measure, it is possible, in a manner not shown, to secure the tool box 16 as by a conventional chain and padlock to the frame 14 in order to eliminate the possibility of someone merely lifting the tool box 16 from frame 14 and into a truck (not shown) disposed adjacent to truck 12.

In view of the above description and from the drawings, it can be appreciated that a mount 10 according to the present invention provides a simple yet rugged, reliable, and secure manner of conveniently placing a conventional tool box, and the like, in the cargo area of a pickup or similar truck so as to place the tool box in a secure position when not in use and in a convenient-to-use position when a workman desires to remove tools from the tool box. In addition, it will be further appreciated that more than one mount 10 could be provided in a cargo area of a pickup truck, with at least one other mount 10 being disposed in, for example, the right rear portion of bed 20 in a manner not shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A tool box mount for a pickup truck, comprising, in combination:
    (a) a frame arranged for supporting a tool box; and
    (b) support means connected to the frame for attaching the frame to a bed of a pickup truck and permitting the frame to swing over the bed between a first position and a second position, the support means including in combination:
    (1) base means anchorable to the bed of a pickup truck;
    (2) arm means rotatably connected both to the base means and to the frame for swinging the frame between the first position and the second position; and
    (3) lock means mounted on the base means and selectively engageable with the arm means for retaining the frame in one of the first position and the second position, with the frame means including a framework which lies in a single plane, is rectangular in plan, and includes a longitudinal element disposed bisecting the framework, the arm means being connected to the longitudinal element, with the first position being when the longitudinal element is perpendicular to an adjacent side of the bed of the truck, and the second position being when the longitudinal element is perpendicular and adjacent to a rear edge of the bed of the truck, with the side wall and rear edge being disposed at substantially right angles with respect to one another.

2. A structure as defined in claim 1, wherein the frame is provided with at least one vertically upstanding guide connected to and disposed extending perpendicularly from the plane of the framework for protecting a tool box from damage.

3. A structure as defined in claim 1, wherein the base means includes a plate attachable to the bed of a truck, a bush being mounted on the plate and extending perpendicularly therefrom, the bush being provided with a through bore arranged for journaling the arm means and permitting swinging movement thereof.

4. A structure as defined in claim 3, wherein the arm means includes an elongate member having a pair of spaced end portions, one of the end portions being provided with a perpendicularly extending shaft journaled in the bush of the base means, and the other of the end portions being provided with a sleeve extending codirectionally with the shaft, a projecting member being provided on the longitudinal element of the framework, with the projecting member being disposed journaled in the sleeve.

5. A structure as defined in claim 4, wherein the lock means includes a cylinder having a central through hole and mounted on the plate of the base means, an aperture provided in the plate and disposed communicating with the hole of the sleeve, a pin slidably disposed in the hole and aperture, the elongate member being provided at the one of the end portions with a flange, a pair of spaced eyes provided in the flange, the pin selectively engaging one of the eyes for retaining the frame in one of the first position and the second position.

6. A structure as defined in claim 5, wherein the frame is provided with at least one vertically upstanding guide connected to and disposed extending perpendicularly from the plane of the framework for protecting a tool box from damage.

7. In combination with a pickup truck including a bed having a rear edge and a side wall bordering the bed, the rear edge and side wall substantially at right angles with respect to one another, a tool box mount, comprising, in combination:
    (a) a frame arranged for supporting a tool box; and
    (b) support means connected to the frame for attaching the frame to the bed of the truck and permitting the frame to swing over the bed between a first position and a second position, the support means including, in combination:
    (1) base means anchorable to the bed of the pickup truck;
    (2) arm means rotatably connected both to the base means and to the frame for swinging the frame between the first position and the second position; and
    (3) lock means mounted on the base means and selectively engageable with the arm means for retaining the frame in one of the first position and the second position, with the frame means including a framework which lies in a single plane and includes a longitudinal element disposed across the framework, the arm means being connected to the longitudinal element, with the first position being when the longitudinal element is perpendicular to an adjacent side of the bed of the truck, and the second position being when the longitudinal element is perpendicular and adjacent to a rear edge of the bed of the truck, with the side wall and rear edge being disposed at substantially right angles with respect to one another.

* * * * *